(12) United States Patent
Kobayashi

(10) Patent No.: US 10,393,250 B2
(45) Date of Patent: Aug. 27, 2019

(54) STRAIN WAVE GEARING AND WAVE GENERATOR

(71) Applicant: HARMONIC DRIVE SYSTEMS INC., Shinagawa-ku, Tokyo (JP)

(72) Inventor: Masaru Kobayashi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 236 days.

(21) Appl. No.: 15/550,697

(22) PCT Filed: Feb. 13, 2015

(86) PCT No.: PCT/JP2015/054040
§ 371 (c)(1),
(2) Date: Aug. 11, 2017

(87) PCT Pub. No.: WO2016/129123
PCT Pub. Date: Aug. 18, 2016

(65) Prior Publication Data
US 2018/0031103 A1 Feb. 1, 2018

(51) Int. Cl.
*F16H 49/00* (2006.01)
*H02N 2/00* (2006.01)

(52) U.S. Cl.
CPC .......... *F16H 49/001* (2013.01); *H02N 2/00* (2013.01)

(58) Field of Classification Search
CPC .......... F16H 49/001; F16H 2049/003
See application file for complete search history.

(56) References Cited

U.S. PATENT DOCUMENTS 4,909,098 A * 3/1990 Kiryu .................. F16C 33/40
384/532
7,484,436 B2 * 2/2009 Kiyosawa ............ F16C 19/52
184/6.12

(Continued)

FOREIGN PATENT DOCUMENTS

JP    S 63-110966 A    5/1988
JP    H 01-158250 A    6/1989

(Continued)

OTHER PUBLICATIONS

International Search Report (PCT/ISA/210) dated May 19, 2015, by the Japanese Patent Office as the International Searching Authority for International Application No. PCT/JP2015/054040.

(Continued)

*Primary Examiner* — Ha Dinh Ho
(74) *Attorney, Agent, or Firm* — Buchanan Ingersoll & Rooney PC

(57) ABSTRACT

A wave generator of a strain wave gearing uses a plurality of solid displacement elements to flex a flexible externally toothed gear into a non-circular shape and partially mesh the externally toothed with a rigid internally toothed gear. The solid displacement elements are obtained by curving a monomorphic or bimorphic type rectangular plate-shaped element into an arc shape and can be deformed from an arc shape to a semispherical shape by energization, the semicircular shape having a smaller radius than the arc radius of the arc shape. A wave generator can be realized, which can bear a large load torque by utilizing changes in rigidity, deformation amount, and deformation force associated with the deformation of the solid displacement elements.

9 Claims, 10 Drawing Sheets

(56) References Cited

U.S. PATENT DOCUMENTS

| | | | | |
|---|---|---|---|---|
| 7,721,625 B2* | 5/2010 | Saito | ............... | F16H 49/001 |
| | | | | 74/640 |
| 8,656,800 B2* | 2/2014 | Cho | ............... | F16H 49/001 |
| | | | | 74/411 |
| 8,677,963 B2* | 3/2014 | Stoltz-Douchet | ....... | F01L 1/344 |
| | | | | 123/90.11 |

FOREIGN PATENT DOCUMENTS

| | | |
|---|---|---|
| JP | H 05-024750 B2 | 4/1993 |
| JP | H 07-110140 B2 | 11/1995 |
| JP | 2000-166264 A | 6/2000 |
| JP | 2007-071242 A | 3/2007 |
| JP | 2011-152026 A | 8/2011 |

OTHER PUBLICATIONS

Written Opinion (PCT/ISA/237) dated May 19, 2015, by the Japanese Patent Office as the International Searching Authority for International Application No. PCT/JP2015/054040.

\* cited by examiner (b)

(a)

STRAIN WAVE GEARING AND WAVE GENERATOR

FIELD OF THE INVENTION

The present invention relates to a wave generator of a strain wave gearing using solid displacement elements that can be stretched and contracted by energization, and to a strain wave gearing provided with the wave generator.

BACKGROUND ART

A wave generator of a strain wave gearing causes a flexible externally toothed gear to flex into a non-circular shape and partially mesh with a rigid internally toothed gear, and causes the meshing position between the two gears to move circumferentially, whereby relative rotation between the two gears is generated in accordance with the difference in teeth therebetween. As proposed in patent documents 1 and 2, there is known a wave generator using piezoelectric elements which are solid displacement elements stretchable and contactable by energization.

The wave generator of this configuration flexes each part in the circumferential direction of an externally toothed gear repeatedly in the radial direction with constant amplitude and constant period, to thereby move the meshing position of the externally toothed gear with an internally toothed gear in the circumferential direction. Whereby, relative rotation according to the difference in teeth between the externally toothed gear and the internally toothed gear is generated between the two gears.

PRIOR ART DOCUMENTS

Patent Documents

Patent Document 1: JP 2011-152026 A
Patent Document 2: JP 2007-71242 A

SUMMARY OF THE INVENTION

Problems to be Solved by the Invention

A conventional wave generator using solid displacement elements cannot produce a sufficient deformation required to flex an externally toothed gear, and is often insufficient in rigidity in the radial direction. For this reason, it is often difficult to put this wave generator into practical use as a wave generator for a strain wave gearing with a large load torque capacity.

An object of the present invention is to provide a wave generator of a strain wave gearing capable of bearing a large load torque by making use of rigidity, deformation amount and deformation force of plate-shaped displacement elements that are curved into an arc shape, and to provide a strain wave gearing equipped with the wave generator.

Means of Solving the Problems

In order to solve the above problems, the present invention is directed to a wave generator of a strain wave gearing; the wave generator causing to flex each part in a circumferential direction of a flexible externally toothed gear in a radial direction with constant amplitude and constant period by utilizing a plurality of solid displacement elements, and moving meshing positions of the externally tooted gear with a rigid internally toothed gear in the circumferential direction, so that relative rotation between the two gears is generated according to a difference in teeth between the externally toothed gear and the internally toothed gear, characterized in which the solid displacement elements are a monomorphic type or bimorphic type rectangular plate-shape element that is curved into an arc shape, and can be deformed from the arc shape into a semicircular shape by energization, the arch shape having a smaller radius than an arc radius of the arc shape, and in which portions of the externally toothed gear, which are flexed by the solid displacement elements that are deformed into the semicircular shape, are meshed with the internally toothed gear.

When the solid displacement element is deformed from a flat arc shape toward a semicircular shape, the deformation amount in the radial direction is greater than in the chord length direction of the arc until the deformed shape becomes near the semicircular shape, and therefore the top of the convex-side surface of the solid displacement element can be displaced largely. In addition, the rigidity in the radial direction of the solid displacement element when deformed into a semicircular shape, becomes extremely high compared to that of the solid displacement element in a deformed state of an arc shape which is flatter than the semicircular shape.

Accordingly, by deforming the solid displacement elements into a semicircular shape, portions of the externally toothed gear, against which the solid displacement elements press, can be greatly deformed in the radial direction, so that the externally toothed gear can be made to mesh with the internally toothed gear reliably. Although radial load applied to the solid displacement elements is greatest at meshing positions between the two gears, the solid displacement elements located at these positions are deformed in a semicircular shape and have an extremely high rigidity. Therefore, it is possible to realize a wave generator which can bear a large load torque by making use of large displacement and high rigidity in the radial direction of the solid displacement elements.

Where the radius of the semicircular shape of the solid displacement element is Ro and the arc radius is R, it is desirable for the relationship between them to satisfy the following conditional equation.

$$1 < R/Ro < 2$$

When the wave generator of the present invention has an element retaining member for retaining the solid displacement elements, and the element retaining member is provided with a circular outer circumferential surface capable of facing an inner circumferential surface of the externally toothed gear, and a plurality of element retaining parts formed in the circular outer circumferential surface so that they are arranged in equiangular intervals in a circumferential direction; the respective solid displacement elements are retained in the respective element retaining parts in a manner that a convex-side surface of the solid displacement element faces outward in the radial direction of the circular outer circumferential surface. In addition, a first end part the solid displacement element in a length direction thereof is hinged (pinned) to the element retaining part so as not to move, and the other second end part thereof is movable toward and away from the first end part.

In this case, it is desirable that the respective element retaining members be provided with an inclined retaining surface inclined with respect to an orthogonal plane orthogonal to a radial line of the circular outer circumferential surface, and that the first end part of the solid displacement element be hinged to one end of the inclined retaining surface in the circumferential direction and the second end part be slidable along the inclined retaining surface.

By adopting this configuration, the movement of the top of the solid displacement element (a contact position to an inner circumferential surface of the externally toothed gear) becomes close to an elliptical motion of the externally toothed gear. Accordingly, the externally toothed gear can be given a displacement that is closer to a displacement of the externally toothed gear caused by a wave generator using an elliptically-contoured rigid plug.

In addition, in the wave generator of the present invention, the top surface portion of the convex-side surface of the solid displacement element may be pressed against the inner circumferential surface of the externally toothed gear directly or via a flexible ring. When the flexible ring is used, the externally toothed gear can easily be flexed into a desired flexion shape by using a smaller number of solid displacement elements.

Next, in order to increase the amount of flexion of the externally toothed gear by the solid displacement elements, two or more solid displacement elements having the above-mentioned constitution may be used. In this case, each of the solid displacement elements is formed by first and second solid displacement elements, and each of the first and second solid displacement elements is a monomorphic type or bimorph type rectangular plate-shape element that is curved into an arc shape, and can be deformed from the arc shape into a semicircular shape having a smaller radius than the arc radius of the arc shape by energization. In addition, the solid displacement element has a tube shape formed by connecting the first and second solid displacement elements together at their both ends in their length directions, and is deformed from a flat tube shape into a circular tube shape by deforming the first and second solid displacement elements into the semicircular shape. The portions of the externally toothed gear, which are flexed by the solid displacement elements deformed into a circular tube shape, are made to mesh with the internally toothed gear.

In this case, in each of the element retaining parts of the element retaining members for retaining the solid displacement elements, the solid displacement element is held in a state in which convex-side surfaces of the first and second solid displacement elements face in the radial direction of the circular outer circumferential surface so that the first and second solid displacement elements can be deformed in the radial direction.

Next, a strain wave gearing of the present invention is characterized by having the above-constituted wave generator.

MODE FOR CARRYING OUT THE INVENTION

An embodiment of a strain wave gearing provided with a wave generator according to the present invention will be described.

Figure 1:
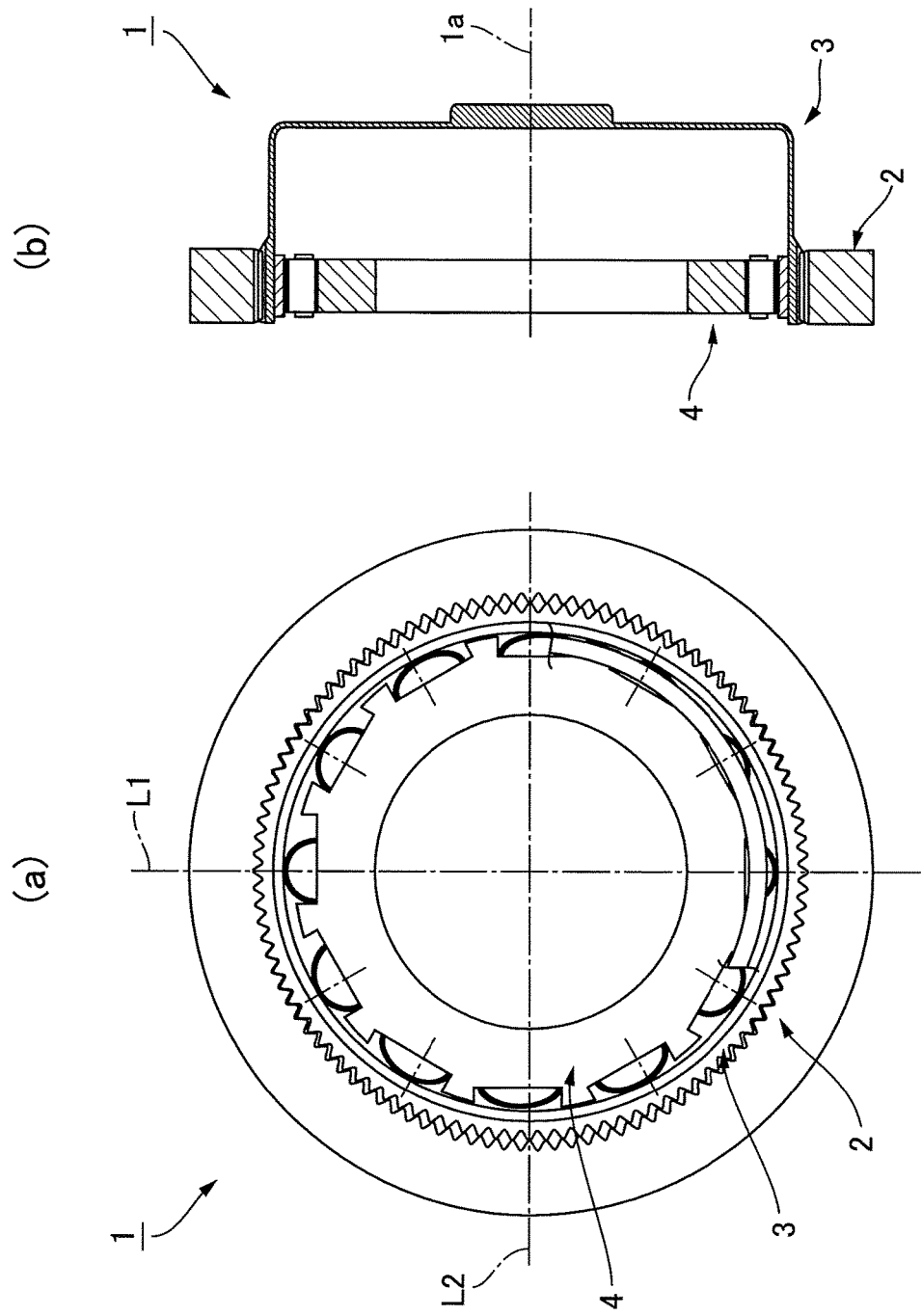
FIGS. 1(a) and (b) include a front view and a longitudinal sectional view of a strain wave gearing to which the present invention is applied.

FIG. 1(a) is a front view showing a strain wave gearing according to the present embodiment, and FIG. 1(b) is a longitudinal sectional view thereof. A strain wave gearing 1 has a rigid internally toothed gear 2, a cup-shaped externally toothed gear 3 arranged coaxially inside the internally toothed gear, and a wave generator 4 mounted coaxially inside the externally toothed gear. For example, the number of teeth of the externally toothed gear 3 is 2n fewer than the number of teeth of the internally toothed gear 2 where n is a positive integer.

The externally toothed gear 3 is flexed into an elliptical shape by the wave generator 4, and is meshed with the internally toothed gear 2 at both ends in the direction of the major axis L1 of the elliptical shape. The meshing positions between the both gears 2 and 3 are caused to move in the circumferential direction of the internally toothed gear 2 by the wave generator 4. The both gears 2 and 3 are caused to rotate relative with each other by an angle corresponding to the difference in teeth between them during one rotation of the meshing position.

Figure 2:
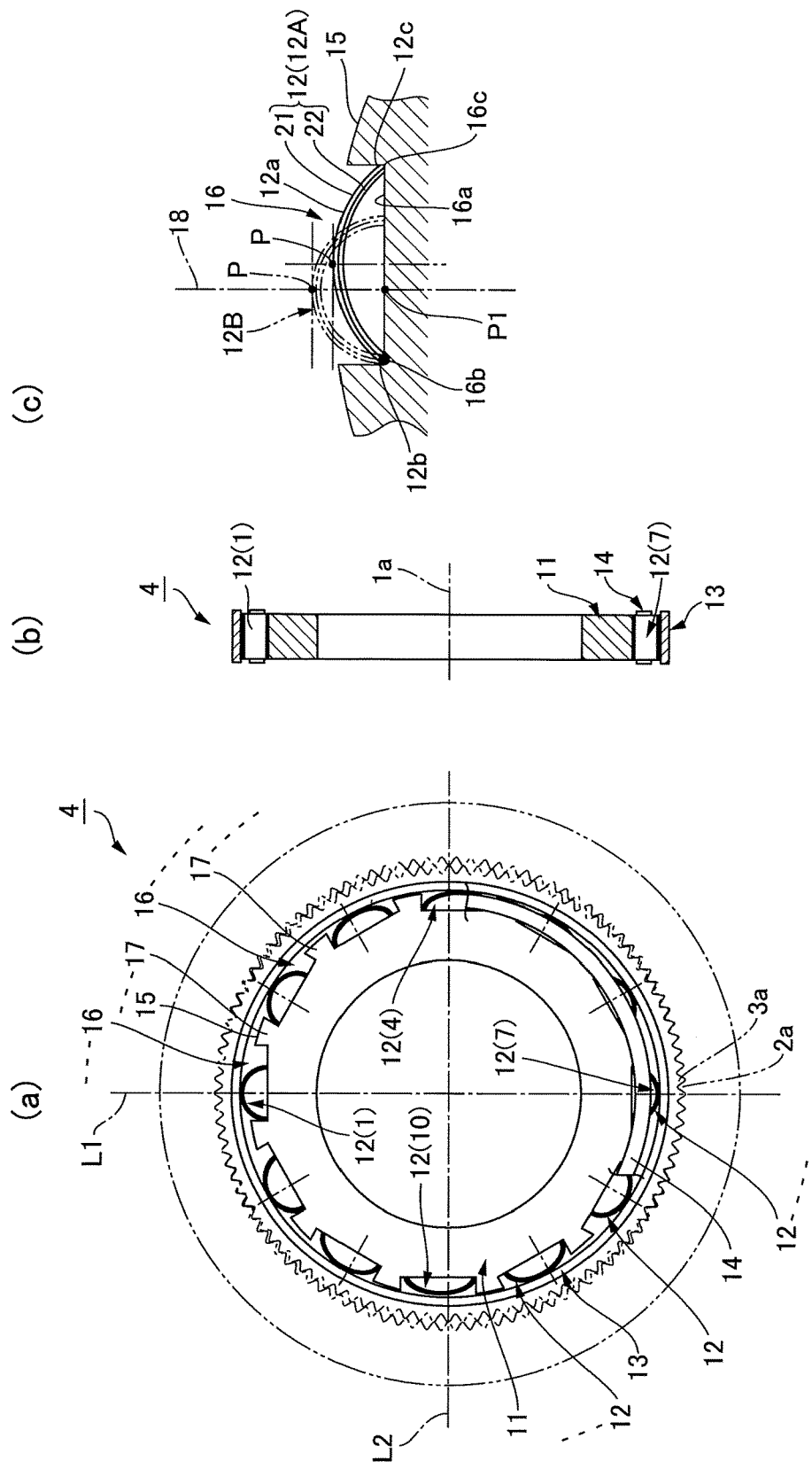
FIGS. 2(a), (b) and (c) include a front view, sectional view and a partially enlarged view, showing a wave generator of the strain wave gearing of FIG. 1.

FIG. 2(a) shows a front view showing the wave generator 4, FIG. 2(b) is a longitudinal sectional view thereof, and FIG. 2(c) is a partial enlarged sectional view thereof. The wave generator 4 is provided with a rigid element retaining member 11 having a circular ring shape, a plurality of solid displacement elements 12 held in the outer circumferential portion of the element retaining member 11, a flexible ring 13 mounted coaxially on the element retaining member 12 so as to cover the outer circumference of the element retaining member, and ring-shaped element holders 14 attached on both sides of the outer circumferential portion of the element retaining member 11.

The element retaining member 11 has a circular outer circumferential surface 15 having a constant width in the direction of the center axis line 1a thereof, and a plurality of element retaining parts 16 are formed in constant angular intervals along the circular direction in the circular outer circumferential surface 15. Each element retaining part 16 is a concave part formed by cutting the full width of the circular outer circumferential portion to a prescribed depth, and the respective pair of adjacent element retaining parts 16 are partitioned by a partition part 17 having a prescribed thickness in the circumferential direction. In this example, twelve element retaining parts 16 are formed. Each element retaining part 16 is provided with a retaining surface 16a orthogonal to a radial line 18 of the element retaining member 11, and the retaining surface 16 is formed so that the distance from an intersection P1 with the radial line 18 to an end 16b on one side is shorter than the distance from the intersection to an end 16c on the other side.

The solid displacement elements 12 are held in the respective element retaining parts 16 one by one. Each solid displacement element 12 is a rectangular plate-like element that is curved in an arc shape, the plate-like element having a width that is the same as that of the retaining surface 16a and having a length greater than the length of the retaining surface 16a. Each solid displacement element 12 is a monomorphic type displacement element provided with a rectangular electrode plate 21 that is curved into an arc shape, and a plate-like piezoelectric element 22 laminated on the concave surface side of the electrode plate 21. It is possible to use a shape memory alloy for the solid displacement element 21

The solid displacement elements 12 are held from both sides by the element holders 14 so that the solid displacement elements 12 do not move out of the element retaining parts 16 in the width direction. The element holders 14 are attached to side face portions on both sides of the respective partition parts 17 between the adjacent element retaining parts 16. In addition, the solid displacement elements 12 are pressed against the inner circumferential surface of the flexible ring 13 from the inner side, the flexible ring being arranged on the radially outside of the solid displacement elements.

As shown in FIG. 2(c), the initially-set shape of the solid displacement element 12 is an arc shape 12A bridged from the one end 16b to the other end 16c of the retaining surface 16a, and a convex-side surface 12a thereof faces outward in the radial direction of the element retaining member 11. The arc shape 12A is a flat arc shape having a height from the retaining surface 16a (a height in the radial direction) that is low compared to a case in which the solid displace element is made deformed into a semicircular shape 12B shown by imaginary lines. The solid displacement element 12 can be changed in the state of deformation between the flat arc shape 12A and the semicircular shape 12B by controlling energization of the solid displacement element 12.

The first end 12b of the solid displacement element 12 is hinged (pinned) to the one end 16b of the retaining surface 16a, so that the solid displacement element 12 can be rotated in a direction toward and away from the retaining surface 16a centered on the first end part 12b. In contrast to this, the other second end part 12c of the solid displacement element 12 is a free end, so that it is movable toward and away from the first end part 12b. In addition, when the solid displacement element 12 is in a state being deformed into a semicircular shape 12B, it is set so that the top P thereof is on the radial line 18 orthogonal to the retaining surface 16a.

Further, when the solid displacement element 12 is in a state being deformed into a flat arc shape 12A, it is set so that the top P of the convex-side surface thereof is located in the lowest position and that the lowest position is located on the circular outer circumferential surface 15 of the element retaining member 11. In contract to this, when the solid displacement element 12 is most deformed into a semicircular shape 12B, it is set so that the top P thereof is located in a position which is projected by a certain amount outward in the radial direction from the circular outer circumferential surface 15.

In this example, in order to flex the externally toothed gear 3 into an elliptical shape, the solid displacement elements 12 located on both ends of the major axis L1 of the elliptical shape, namely, the solid displacement elements 12(1) and 12(7) in FIG. 2(a) are made to deform into a semicircular shape 12B, while the solid displacement elements 12 located on both ends of the minor axis L2 orthogonal to the major axis, namely, the solid displacement elements 12(4) and 12(10) are made to deform into a flat arc shape 12A. In addition, from the solid displacement elements 12(4) toward the solid displacement elements 12(7), and from the solid displacement element 12(10 toward the solid displacement element 12(1), respectively, the deformation amounts of the respective solid displacement elements 12 are made to increase gradually so that the deformed shapes become toward a semicircular shape. Whereby, an elliptical shape that circumscribes the tops P of the solid displacement elements 12 can be defined.

The flexible ring 13 is mounted on the outer circumference of the element retaining member 11. The inner diameter of the circular ring 13 is slightly greater than the circular outer circumferential surface 15 of the element retaining member 11. Accordingly, the circular ring 13 is flexed in the radial direction by the solid displacement elements 12 deformed as described above, and is made to become an elliptical shape defined by the tops P of the solid displacement elements. In a case shown in FIG. 2(a), a diameter line passing through the solid displacement elements 12 (1) and 12 (7) becomes a position of the major axis L1, and a diameter line passing through the solid displacement elements 12 (4) and 12 (10) becomes a position of the minor axis L2.

The flexible ring 13 is fitted into the inner circumferential surface of the flexible externally toothed gear 3. Accordingly, the externally toothed gear 3 is also flexed into an elliptical shape by the circular ring 13 that has been deformed into an elliptical shape. As a result, external teeth 3a of the externally toothed gear 3 mesh with internal teeth 2a of the internally toothed gear 2 on both ends of the major axis L1 of the elliptical shape.

Figure 3:
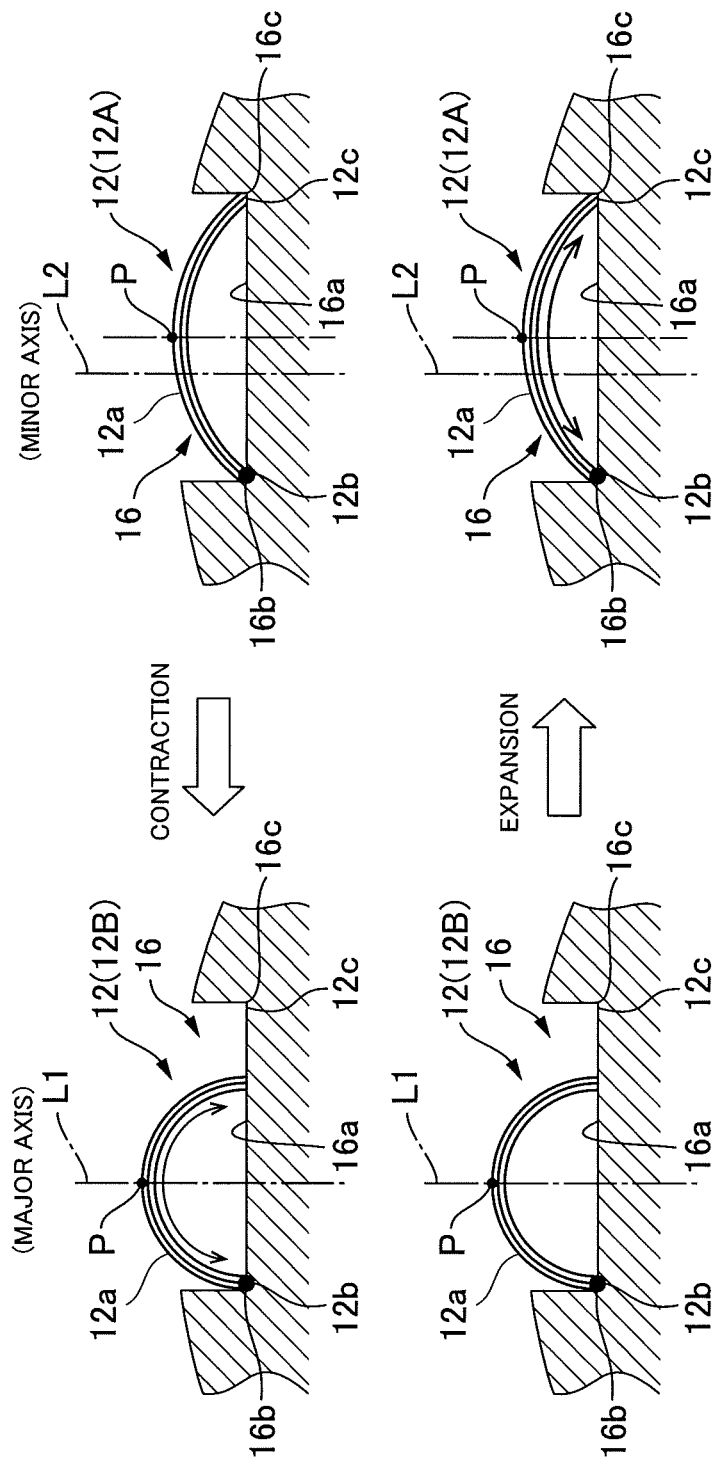
FIG. 3 includes explanatory views showing deformed states of a solid displacement element of the wave generator of FIG. 2.

FIG. 3 shows deformed states of the solid displacement element 12. By changing the deformed states of the respective solid displacement elements 12 sequentially in the circumferential direction, the elliptical shape rotates about the center axis line 1a (refer to FIG. 1), and the meshing positions between the both gears 2 and 3 move in the circumferential direction. Specifically, the solid displacement elements 12 that define the position of the minor axis L2 of the elliptical shape are contracted gradually to become a semicircular shape 12B and define the position of the major axis of the elliptical shape. In contrast, the solid displacement elements 12 that define the position of the major axis of the elliptical shape are elongated gradually to return to a flat arc shape 12A and define the position of the minor axis of the elliptical shape.

The wave generator 4 of the present example can bear a large load torque by making use of the change in rigidity, deformation amount and deformation force associated with the deformation of the arc-shaped solid displacement elements 12 as mentioned above. Explanation will be made below in this regard.

(Displacement and Radial Rigidity of Arc Shape of Solid Displacement Elements)

Figure 4:
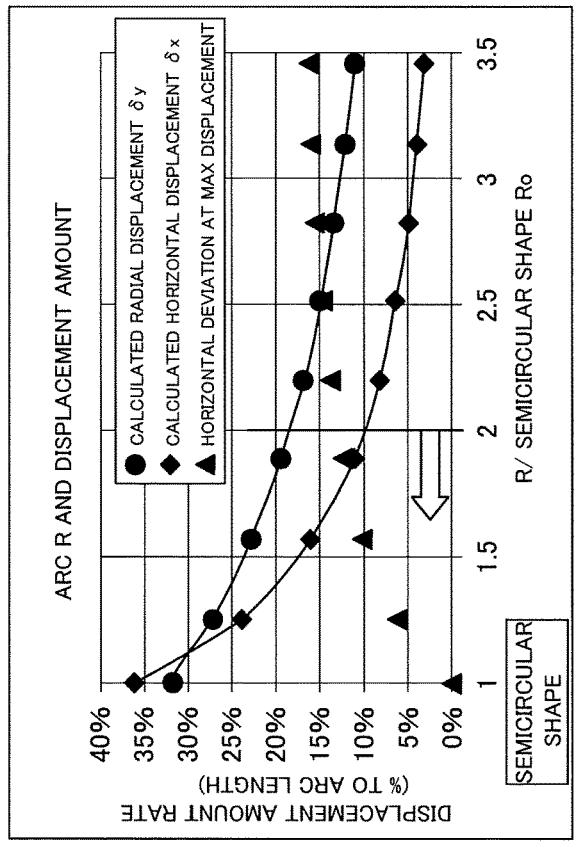
FIGS. 4(a) and (b) include explanatory views showing deformation amounts in a radial direction and a chord length direction, and a graph showing a relationship between an arc radius and a deformation amount.
Figure 4:
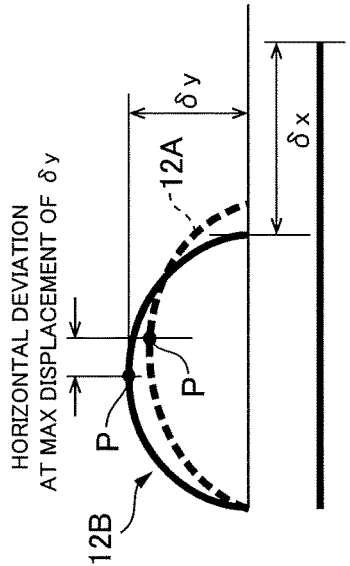

FIG. 4(a) is an explanatory view showing displacement amounts in the radial direction and chord length direction of the arc shape of the solid displacement element 12, and FIG.

4(b) is a graph showing a relationship between the flatness ratio and the displacement amount rate of the solid displacement element 12.

As can be seen from the graph in FIG. 4(b), the displacement amounts δx (in the chord length direction of the arc shape) and δy (in the radial direction the arc shape) of the arc-shaped solid displacement element 12 are both large as the solid displacement element approaches a semicircular shape. Specifically, where the arc radius of the arc shape is R, the radius of the semicircular shape is Ro, and the flatness ratio of the arc shape is R/Ro, the displacement amounts increase as the flatness ratio approaches 1. In addition, the displacement amount rates increase as the flatness ratio decreases from around the point of 2. Further, the relation of δy>δx is seen until near the point of semicircular shape. It can be seen that the horizontal deviation of the top P of the convex-side surface, which is the maximum position of the displacement amount δy, decreases as the solid displacement element approaches the semicircular shape.

In the present invention, the solid displacement elements 12, which are arranged on the positions corresponding to the meshing positions between the externally toothed gear and the internally toothed gear, are deformed into a semicircular shape. Therefore, the top P of the convex-side surface of each of the solid displacement element 12 is displaced largely outward in the radial direction in the meshing position, which makes it easy to secure a displacement amount necessary to flex the externally toothed gear.

Figure 5:
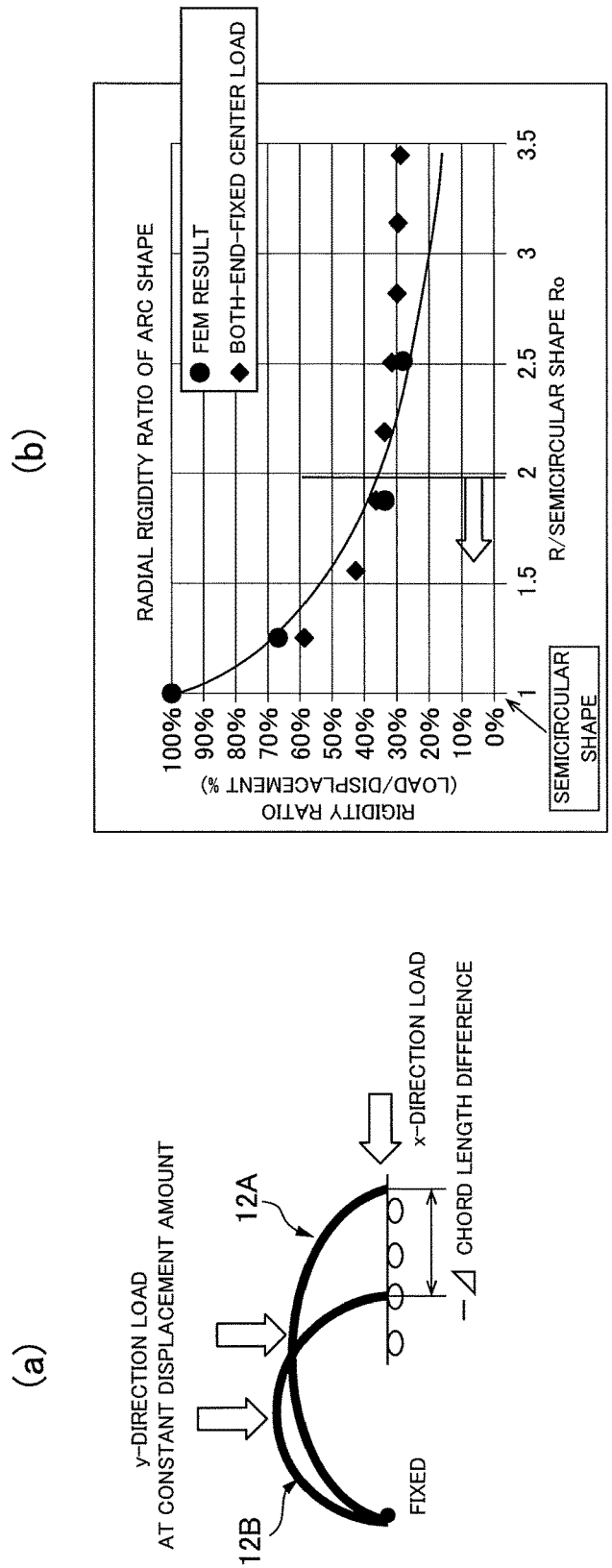
FIGS. 5(a) and (b) include explanatory views showing a rigidity rate in a radial direction of a solid displacement element, and a graph showing a relationship between an arc radius and the rigidity rate in the radial direction.

FIG. 5(a) is an explanatory view showing the radial rigidity ratio of the solid displacement element 12, and FIG. 5(b) is a graph showing a relationship between the flatness ratio and the radial rigidity ratio of the solid displacement element 12.

As can be seen from the graph of FIG. 5(b), the radial rigidity ratio of the solid displacement element 12 increases from around the point where the flatness ratio is 2 toward the point where the flatness ratio is 1, and becomes greatly large when coming close to the semicircular shape (when the flatness ratio comes close to 1). In the present invention, since the solid displacement elements 12 are deformed into a semicircular shape at the position of the major axis L1 of the elliptical shape where the both gears are meshed with each other, the solid displacement elements 12 located at the meshing positions can bear a large load torque.

Figure 6:
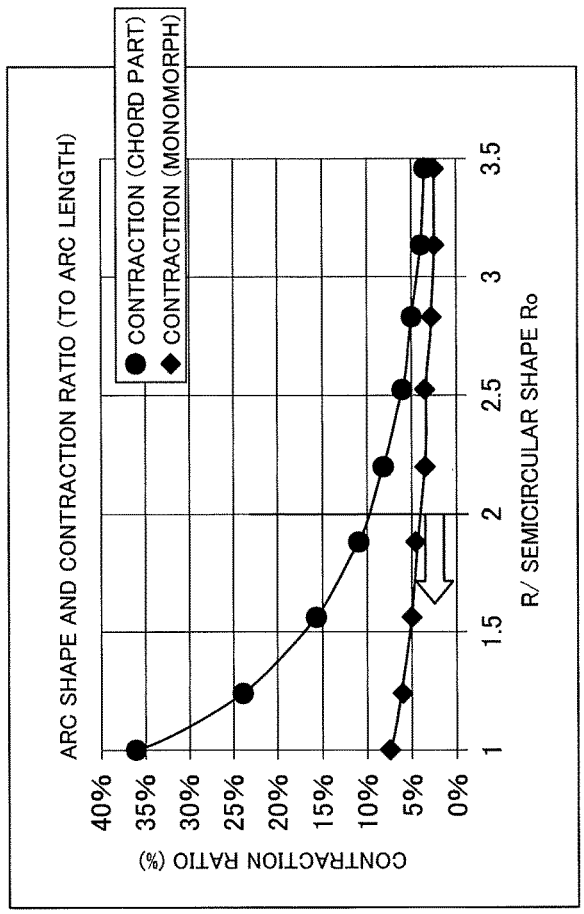
FIGS. 6(a) and (b) include explanatory views showing an amount of contraction in a chord length direction and an amount of contraction in an arc direction, and a graph showing a relationship between an arch radius and a contraction rate.
Figure 6:
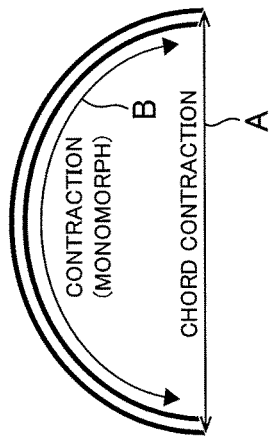

Next, FIG. 6(a) is an explanatory view showing the chord-direction contraction amount and the arc-direction contraction amount of the solid displacement element 12, and FIG. 6(b) is a graph showing a relationship between the flatness ratio and the contraction ratio. As seen from the graph, the contraction amounts for deforming the solid displacement element 12 into a semicircular shape are such that the arc-direction contraction amount (the contraction amount along the arrow B) is extremely small in comparison with the chord-direction contraction amount (the contraction amount along the arrow A). In addition, the arc-direction contraction amount is only increased slightly even when coming close to the semicircular shape.

Based on the above-mentioned deformation and rigidity of the arc shape of the solid displacement element 12, it is desirable that the solid displacement element 12 be made to deform into a semicircular shape at the major-axis position of the elliptical shape which is the meshing position of the both gears 2 and 3, and be made to return to a flat arc shape at the minor-axis position. It is also desirable that a monomorphic type displacement element be used, in which the arc radius R of the arc shape and the radius Ro of the semicircular shape satisfy the following conditional equation.

$$1 < R/Ro < 2$$

As described above, according to the present example, a plurality of solid displacement elements 12 are arranged at equiangular intervals in the circumferential direction inside the flexible ring 13 that is in contact with the inner circumference of the externally toothed gear 3. By deforming the respective solid displacement elements 12 between the arc shape and the semicircular shape repeatedly at constant periods, the respective portions of the externally toothed gear 3 in the circumferential direction can be repeatedly flexed in the radial direction, whereby moving the meshing position in the circumferential direction.

In addition, the solid displacement elements 12 are deformed into a semicircular shape in the vicinity of the major axis L1 of the elliptical shape where the radial load due to the meshing of the both gears 2 and 3 becomes largest. Since the radial rigidity, displacement amount and displacement force when the respective solid displacement elements 12 are deformed into a semicircular shape, are utilized, it is possible to realize the wave generator 4 which can bear a large load torque.

In the present example, the flexible ring 13 is arranged between the externally toothed gear 3 and the solid displacement elements 12, the circular ring 13 is flexed into an elliptical shape by pressing the inner circumferential surface of the circular ring 13 by the top portions of the convex-side surfaces of the solid displacement elements 12, and the externally toothed gear 3 is flexed into an elliptical shape via the ring 13. The externally toothed gear 3 can be flexed directly by the solid displacement elements 12 by deleting the ring 13 and making the top portion of the convex-side surface of each solid displacement element 12 to come in contact with the inner circumferential surface of the externally toothed gear 3.

In the present example, the externally toothed gear 3 is flexed elliptically. Instead, the externally toothed gear 3 can be flexed into a shape so that it meshes with the internally toothed gear 2 at three positions at the same time. In addition, although twelve solid displacement elements 12 are arranged in the present example, it is possible that the other number of solid displacement elements be arranged. At least four solid displacement elements 12 may be arranged at equiangular intervals.

Figure 7:
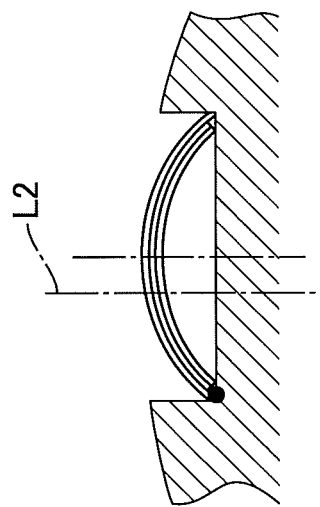
FIGS. 7(a) and (b) are explanatory views showing another example of the solid displacement element.
Figure 7:
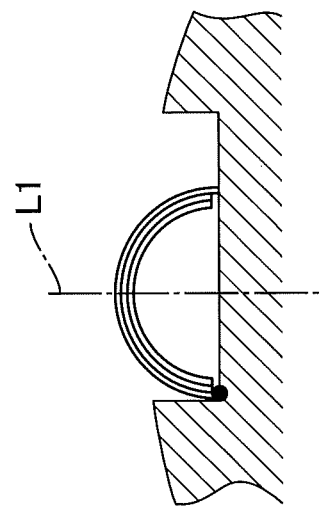

Next, a bimorphic type displacement element can be used instead of a monomorphic type displacement element for the solid displacement element 12 as shown in FIG. 7.

Figure 8:
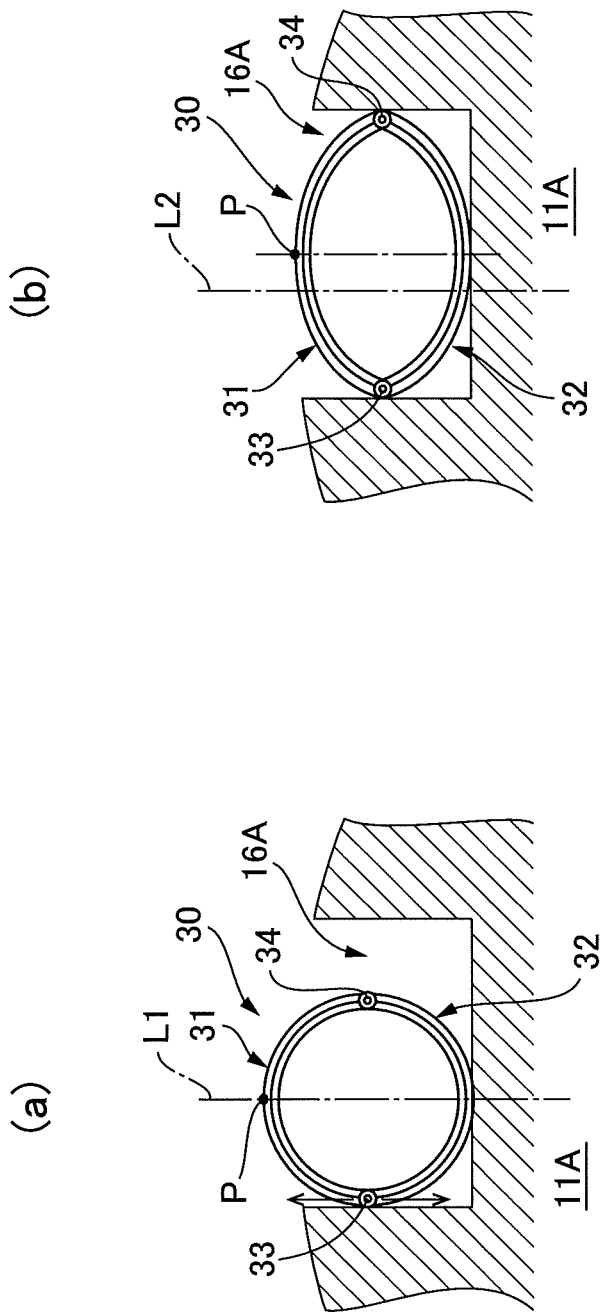
FIGS. 8(a) and (b) are explanatory views showing another example of the solid displacement element.

In addition, a connection type solid displacement element as shown in FIG. 8 can be used for the solid displacement element. As shown in FIG. 8(b), a connection type solid displacement element 30 is constituted so that first and second solid displacement elements 31 and 32 are hinged (pinned) together on their both ends in their length directions to form a flat tube shape having connection ends 33 and 34. The first and second displacement elements 31 and 32 respectively are the same as the above-mentioned solid displacement element 12.

In addition, in each element retaining part 16A of the element retaining member 11A, one connection end 33 is movable only in the radial direction and the other connection end 34 is movable in the direction toward and away from the connection end 33.

Accordingly, when the connection type solid displacement element 30 is energized, the first and second displacement elements 31 and 32 are respectively deformed from a flat arc shape into a semicircular shape. As a result, the connection type solid displacement element 30 becomes a state being deformed into a circular tube shape.

In this way, the convex-side surfaces of the first and second solid displacement elements 31 and 32 face both sides in the radial direction, so that the displacement amount of the top P that presses the externally toothed gear 3 can be doubled in comparison with a case in which a single solid displacement element is used.

[Another Example of Wave Generator]

Figure 9:
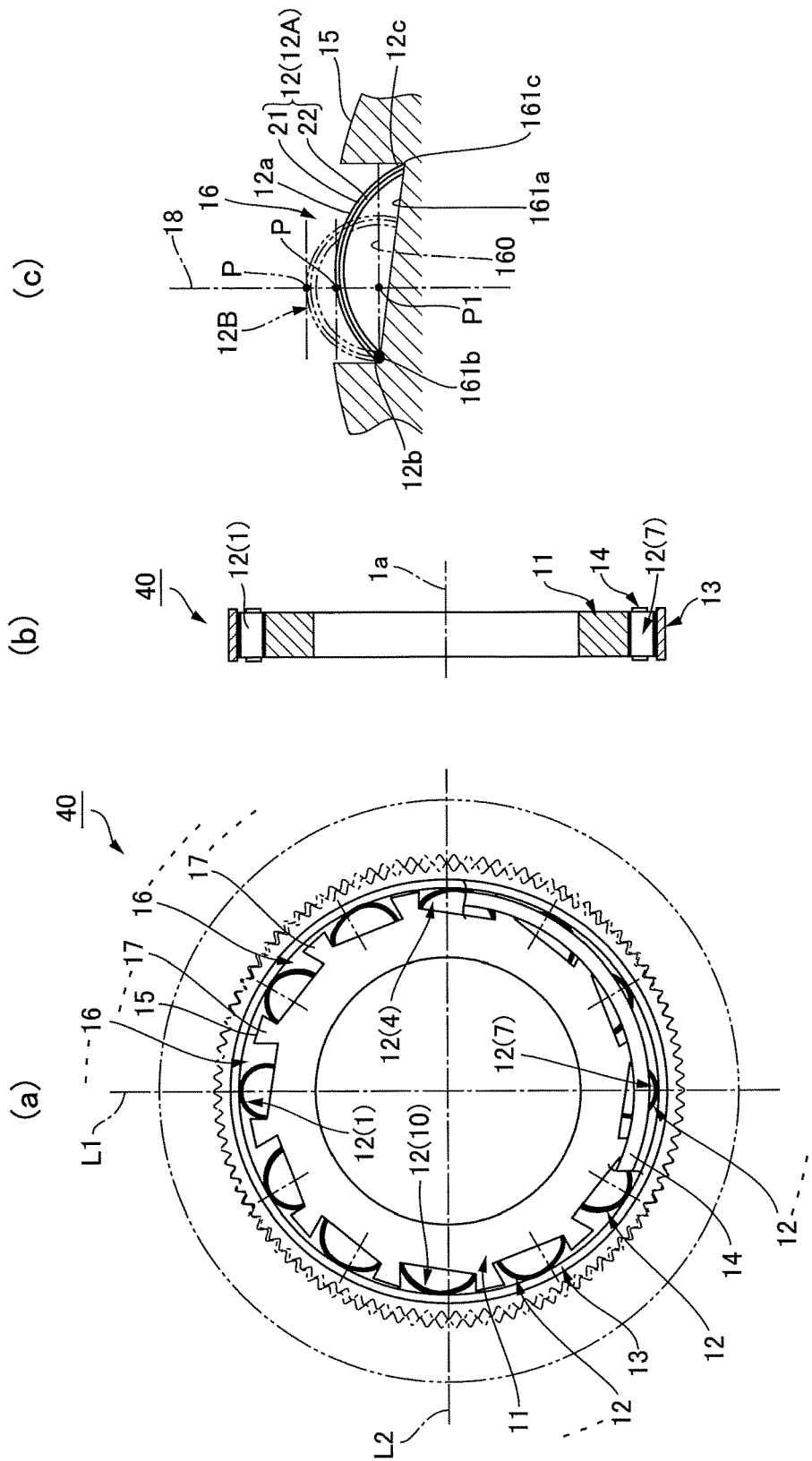
FIGS. 9(a), (b) and (c) include a front view, a sectional view and a partial enlarged sectional view, showing another example of a wave generator of a strain wave gearing to which the present invention is applied.

FIG. 9(a) is a front view showing another example of the wave generator 4, FIG. 9(b) is a partial longitudinal sectional view thereof, and FIG. 9(c) is a partial enlarged sectional view thereof. A wave generator 40 of this example has the same basic configuration as the above-mentioned wave generator 4. Thus, corresponding parts of the wave generator 40 are denoted by the same reference numerals, explanation thereof is omitted.

In the wave generator 40 of this example, the retaining surface of each element retaining part 16 is an inclined retaining surface 161a. The inclined retaining surface 161a is an inclined plane inclined by a certain angle toward the circumferential direction with respect to an orthogonal surface 160 shown by dotted lines, the orthogonal surface being orthogonal to the radial line of the circular outer circumferential surface 15. In this example, the inclined retaining surface is an inclined plane inclined by 10 degrees with respect to the orthogonal surface 160 so that it is inclined radially inward from one end 161b toward the other end 161c.

One end 12b of the solid displacement element 12 is hinged to one end 161b of the inclined retaining surface 161a, and the other end 12c thereof is slidable along the inclined retaining surface 161a. It is set so that, when the solid displacement element 12 is in a state of semicircular shape 12B, the top P thereof is located on the radial line 18.

It is also set so that, when the solid displacement element 12 is in a state of a flat arc shape 12A, the top P of the convex-side surface 12a thereof is located at its lowest position that is located on the circular outer circumferential surface 15 of the element retaining member 12. Further, it is set so that, when the solid displacement element 12 is in a most deformed state of a semicircular shape 12B, the top P thereof is located on a position that is projected outward in the radial direction by a prescribed amount from the circular outer circumferential surface 15.

In this example, in order to flex the externally toothed gear 3 into an elliptical shape, the solid displacement elements 12, specifically, the solid displacement elements 12(1) and 12(7) located on both ends of the major axis L1 of the elliptical shape in FIG. 9(a) are deformed into a semicircular shape 12B, while the solid displacement elements 12 located on both ends of the minor axis L2 orthogonal to the major axis, specifically, the solid displacement elements 12(4) and 12 (10) in FIG. 9(a) are maintained to be a flat arc shape 12A. In addition, the solid displacement elements 12 are gradually increased in deformation amount to that their deformed shape come close to a semicircular shape 12B starting from the solid displacement element 12(4) toward the solid displacement element 12(7), and starting from the solid displacement element 12(10) toward the solid displacement element 12 (1). Whereby, an elliptical shape, to which the tops P of the respective solid displacement elements 12 are inscribed, is defined.

Figure 10:
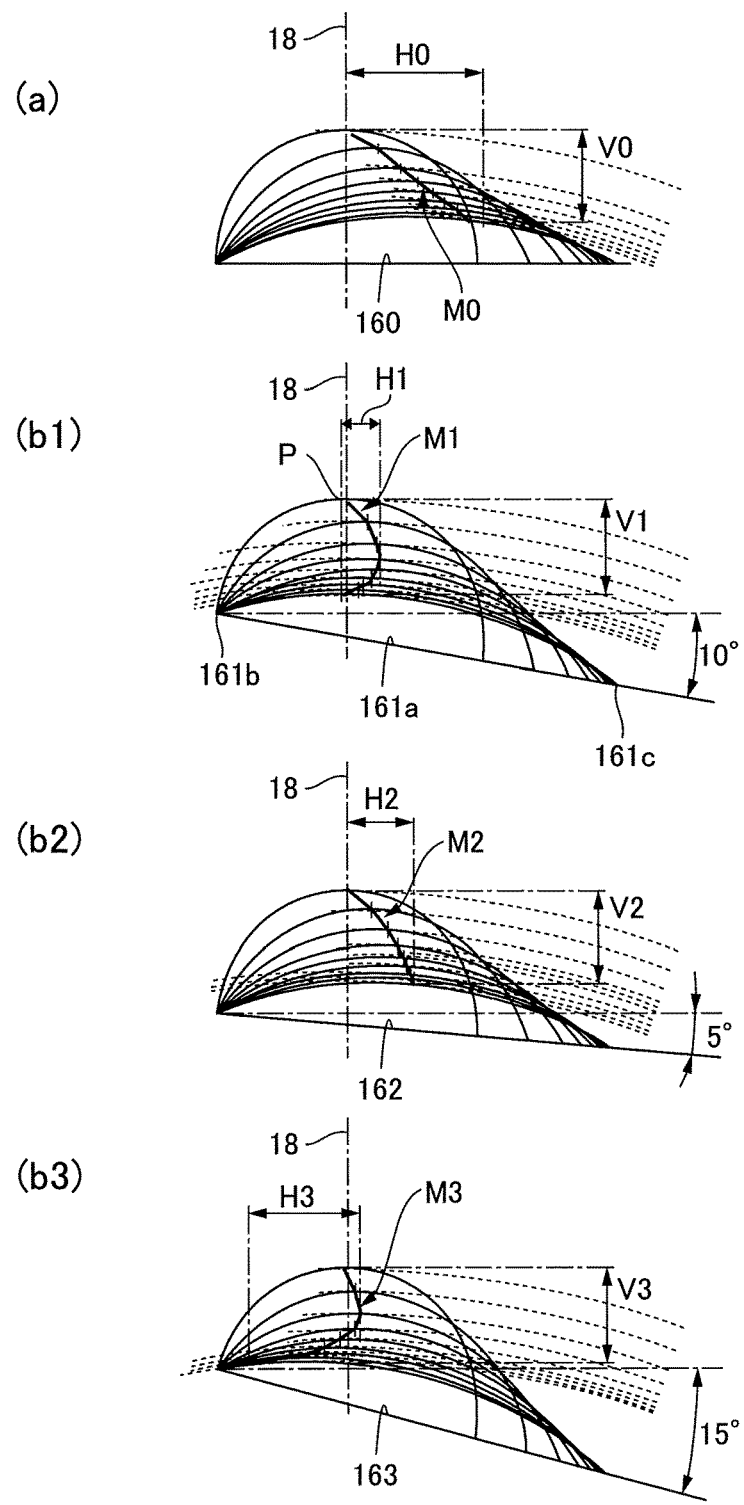
FIGS. 10(a), (b1), (b2) and (b3) include explanatory views showing a movement of the top of a solid displacement element when the retaining surface thereof is changed.

FIG. 10 is an explanatory view showing motions of the top P of the solid displacement element 12 associated with the deformation of the solid displacement element, in which FIG. 10(a) is an explanatory view where an orthogonal surface 160 is used as the retaining surface, FIG. 10(b1) is an explanatory view where an inclined retaining surface 161a inclined by 10 degrees with respect to the orthogonal surface 160 is used, FIG. 10(b2) is an explanatory view where an inclined retaining surface 162 inclined by 5 degrees to the orthogonal surface 160 is used, and FIG. 10(b3) is an explanatory view where an inclined retaining surface 163 inclined by 15 degrees to the orthogonal surface 160 is used.

As can be seen from these explanatory views, the moving locus M0 of the top P associated with the deformation of the solid displacement element 12 retained on the orthogonal surface 160 becomes liner, in which the displacement amount in the radial direction is V0 and the displacement amount in the direction orthogonal to the radial line 18 is H0. In contrast, in the cases of the inclined retaining surfaces 161a, 162 and 163, the moving loci M1, M2 and M3 of the top P become curves that are bent in one direction. The displacement amounts V1, V2 and V3 in the radial direction are almost the same as the displacement amount V0, but the displacement amounts H1, H2 and H3 in the direction orthogonal to the radial line 18 become small compared to that in the case of the orthogonal surface 160.

Specifically, in the case of this example in which the inclined retaining surface 161a has an inclined angle of 10 degrees, the moving locus M1 is drawn so that the position of the top P of the solid displacement element 12 in an initial arc shape 12A and the position of the top P after the solid displacement element is deformed into a semicircular shape are located approximately on the radial line 18. Therefore, the movement of the top P of each solid displacement element 12 pressing the externally toothed gear (the movement of the contact point with the inner circumferential surface of the externally toothed gear) becomes close to an elliptical motion of the externally toothed gear. As a result, the externally toothed gear can be given a displacement by using the solid displacement elements 12, in which the displacement is close to that of the externally toothed gear caused by a wave generator provided with an elliptical-contoured rigid plug.

Incidentally, the inclination angle of the inclined retaining surface can be set properly according to the size, shape and displacement amount of the solid displacement element, the outer diameter dimension of the wave generator, and other factors. It is desirable that the position of the top P of the initial arc-shaped solid displacement element 12 and the position of the top P after being deformed into a semicircular shape be approximately located on the radial line 18 as shown in FIG. 10(b).

The invention claimed is:

1. A wave generator of a strain wave gearing, wherein the wave generator flexes each part in a circumferential direction of a flexible externally toothed gear in a radial direction with a constant amplitude and a constant period by utilizing a plurality of solid displacement elements, and moves meshing positions of the externally toothed gear with a rigid internally toothed gear in the circumferential direction, so that a relative rotation between the two gears is generated according to a difference in teeth between the externally toothed gear and the internally toothed gear; the wave generator being characterized in that:

the solid displacement elements are a monomorphic type or bimorphic type rectangular plate-shape element that is curved into an arc shape, and is deformable from the arc shape into a semicircular shape by energization, the semicircular shape having a smaller radius than an arc radius of the arc shape;

wherein portions of the externally toothed gear flexed by the solid displacement elements that are deformed into the semicircular shape, are meshed with the internally toothed gear;

wherein an element retaining member for retaining the solid displacement elements, is provided; and wherein the element retaining member is provided with a circular outer circumferential surface capable of facing an inner circumferential surface of the externally toothed mar, and a plurality of element retaining parts formed in the circular outer circumferential surface so as to be arranged in equiangular intervals in a circumferential direction;

the respective solid displacement elements are retained in the respective element retaining parts in a manner that a convex-side surface of each of the solid displacement elements faces outward in a radial direction of the circular outer circumferential surface; and a first end part of each of the solid displacement elements in a length direction thereof is hinged to the element retaining part so as not to move, and a second end part thereof is movable in a direction toward and away from the first end part.

2. The wave generator of the strain wave gearing according to claim 1,
wherein, where the radius of the semicircular shape of the solid displacement elements is Ro and the arch radius is R, a conditional equation, $$1<R/Ro<2$$

is satisfied.

3. The wave generator of the strain wave gearing according to claim 1,
wherein each of the element retaining parts is provided with an inclined retaining surface inclined toward the circumferential direction with respect to an orthogonal plane that is orthogonal to a radial line of the circular outer circumferential surface; and
the first end part of each of the solid displacement elements is hinged to one end of the inclined retaining surface in the circumferential direction, and the second end part is slidable along the inclined retaining surface.

4. The wave generator of the strain wave gearing according to claim 1, wherein a top portion of the convex-side surface of each of the solid displacement elements presses an inner circumferential surface of the externally toothed gear directly or via a flexible ring.

5. A wave generator of a strain wave gearing, wherein the wave generator flexes each part in a circumferential direction of a flexible externally toothed gear in a radial direction with a constant amplitude and a constant period by utilizing a plurality of solid displacement elements, and moves meshing positions of the externally toothed gear with a rigid internally toothed gear in the circumferential direction, so that a relative rotation between the two gears is generated according to a difference in teeth between the externally toothed gear and the internally toothed gear; the wave generator being characterized in that:

each of the solid displacement elements is formed by first and second solid displacement elements;

wherein the first and second solid displacement elements are a monomorphic type or bimorphic type rectangular plate-shape element that is curved into an arc shape, and is deformable from the arc shape into a semicircular shape by energization, the semicircular shape having a smaller radius than an arc radius of the arc shape; and wherein portions of the externally toothed gear flexed by the solid displacement elements that are deformed into the semicircular shape, are made to mesh with the internally toothed gear.

6. The wave generator of the strain wave gearing according to claim 5,
wherein, where the radius of the semicircular shape of the solid displacement elements is Ro and the arch radius is R, a conditional equation, $$1<R/Ro<2$$

is satisfied.

7. The wave generator of the strain wave gearing according to claim 5, comprising:
an element retaining member for retaining the solid displacement elements,
wherein the element retaining member is provided with a circular outer circumferential surface capable of facing an inner circumferential surface of the externally toothed gear, and a plurality of element retaining parts formed in the circular outer circumferential surface so as to be arranged in equiangular intervals in a circumferential direction;
the respective solid displacement elements are retained in the respective element retaining parts in a manner that convex-side surfaces of the first and second solid displacement elements face outward in a radial direction of the circular outer circumferential surface, and that the solid displacement elements are deformable in the radial direction.

8. The wave generator of the strain wave gearing according to claim 5, wherein a top portion of the convex-side surface of each of the solid displacement elements presses an inner circumferential surface of the externally toothed gear directly or via a flexible ring.

9. A strain wave gearing comprising the wave generator as set forth in claim 1.

* * * * *